Patented Aug. 30, 1927.

1,640,952

UNITED STATES PATENT OFFICE.

SIMON J. LUBOWSKY, OF BROOKLYN, NEW YORK, ASSIGNOR TO METAL & THERMIT CORPORATION, OF CARTERET, NEW JERSEY, A CORPORATION OF NEW JERSEY.

METHOD OF TRANSFORMING TITANIUM-DIOXIDE OR RUTILE AND A PRODUCT THEREOF.

No Drawing.   Application filed December 5, 1925.   Serial No. 73,532.

The invention relates to the transformation of titanium-dioxide or rutile into a compound soluble in mineral acids to render the titanium available for other desired titanium compounds.

Heretofore, whenever it was desired to decompose titanium-dioxide or rutile chemically, the only available procedure was either an alkali fusion or a bisulphate fusion and, while these operations were more or less successful in laboratory procedure, on a small scale, the methods employed were wholly lacking in commercial value, because of the technological difficulties arising from the corrosive action of the chemicals employed.

According to the present invention, titanium-dioxide or rutile is mixed in semi-molecular or molecular proportions with magnesium oxide calcined to about Seger cone 18 until the materials enter into chemical combination. The resultant calcined product, in pulverized form, readily dissolves in certain mineral acids and the solution contains the titanium values in a form which renders it readily available for the preparation of various titanium compounds, such as titanium-dioxide, titanic acid, potassium-titanium oxalate, titanium tartrate, etc.

In the practical application of the method, rutile, ground to 150 mesh, is intimately admixed in a pebble mill with magnesium oxide, preferably dead-burned magnesite, in about equal weights. The mixture is then transferred to a kiln, furnace or crucible and heated to approximately Seger cone 18, until a hard semi-vitreous mass is obtained. The calcined mass is then ground to about 150 mesh or finer and heated in a digester to approximately 90 degrees centigrade with sulphuric acid, in the proportion of about 2½ parts acid to one part of the calcined product by weight, the digesting mass being stirred or agitated. This produces an exothermic reaction and the sintered product combines with the sulphuric acid and forms a cake. Water is then added in the proportions of about two parts by weight to one part of the sulphuric acid employed and the whole stirred until a clear brownish solution is obtained, which solution contains the titanium values in proper form to be converted into whatever titanium compound may be desired. For example, by filtering the solution and boiling the filtrate, a brilliant white precipitate of meta-titanic acid is obtained, which, when calcined, is converted into pure titanium-dioxide of an extremely fine texture and excellent covering qualities.

What I claim is:

1. In transforming titanium-dioxide or rutile into a soluble compound, the process which comprises calcining the same with magnesium oxide to approximately Seger cone 18.

2. In transforming rutile into a soluble compound, the process which comprises calcining the same with magnesium oxide to approximately Seger cone 18, treating the calcined product with a mineral acid, and extracting the resultant compound with water.

3. In transforming rutile into a soluble compound, the process which comprises calcining the same with magnesium oxide to approximately Seger cone 18, treating the calcined product with sulphuric acid, and extracting the resultant compound with water.

4. In transforming rutile into a soluble compound, the process which comprises calcining ground rutile and ground magnesium oxide to substantially Seger cone 18.

5. In transforming rutile into a soluble compound, the process which comprises calcining ground rutile and ground magnesium oxide to substantially Seger cone 18, grinding the calcined product, agitating and digesting the product with sulphuric acid at approximately 90 degrees centigrade, and extracting the resultant cake with water.

6. In transforming titanium dioxide into water soluble compounds as a new intermediate product a compound of titanium and magnesium soluble in mineral acid.

In testimony whereof I affix my signature.

SIMON J. LUBOWSKY.